(12) United States Patent
Einarsson et al.

(10) Patent No.: US 8,230,044 B2
(45) Date of Patent: Jul. 24, 2012

(54) MEDIA CHANNEL MANAGEMENT

(75) Inventors: Torbjörn Einarsson, Stockholm (SE); Magnus Westerlund, Kista (SE); Uwe Horn, Aachen (DE); Thorsten Lohmar, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 670 days.

(21) Appl. No.: 12/305,161

(22) PCT Filed: May 4, 2007

(86) PCT No.: PCT/SE2007/000438
§ 371 (c)(1),
(2), (4) Date: Dec. 16, 2008

(87) PCT Pub. No.: WO2007/149029
PCT Pub. Date: Dec. 27, 2007

(65) Prior Publication Data
US 2010/0223357 A1    Sep. 2, 2010

Related U.S. Application Data

(60) Provisional application No. 60/805,112, filed on Jun. 19, 2006.

(51) Int. Cl.
*G06F 15/16* (2006.01)
*G06F 15/173* (2006.01)

(52) U.S. Cl. ........ 709/219; 709/201; 709/202; 709/203; 709/206; 709/217; 709/223; 709/224; 709/225; 709/226; 709/227; 709/230; 709/231

(58) Field of Classification Search .......... 709/201–203, 709/206, 217, 219, 223–227, 230, 231
See application file for complete search history.

(56) References Cited

U.S. PATENT DOCUMENTS

| 7,043,564 | B1 * | 5/2006 | Cook et al. | 709/246 |
| 7,334,017 | B2 * | 2/2008 | Hawkes et al. | 709/205 |
| 7,412,529 | B2 * | 8/2008 | Ryu | 709/230 |
| 7,500,133 | B2 * | 3/2009 | Galchev et al. | 714/4.4 |

(Continued)

FOREIGN PATENT DOCUMENTS
WO    WO 02/09009 A1    1/2002
(Continued)

OTHER PUBLICATIONS

Philippe Centric. RTSP Stream Switching. Draft-gentric-mmusic-stream-switching-01.txt. Internet Citation. Jan. 1, 2004.

(Continued)

*Primary Examiner* — Thu Nguyen
*Assistant Examiner* — Angela Widhalm

(57) ABSTRACT

The media session management of the invention encompasses a media server having access to multiple unicast-based media channels and a user terminal. The user terminal generates and transmits a generic, channel-transparent session request to the server. This request initiates a generic, channel-transparent media session setup procedure between the terminal and the server. The setup procedure involves exchange of requests and responses but no media channel is yet selected or notified at the server. Once the channel-transparent setup has been completed, the user terminal transmits a channel-specific rendering request for a desired media channel to the server. In a subsequent channel switch, the terminal simply transmits a new channel-specific request for a new channel to the server during the ongoing session and reusing the negotiated transport parameters of the channel-transparent setup procedure.

20 Claims, 12 Drawing Sheets

U.S. PATENT DOCUMENTS

| | | | |
|---|---|---|---|
| 7,609,700 B1 * | 10/2009 | Ying et al. | 370/395.21 |
| 2005/0262251 A1 | 11/2005 | Klemets et al. | |
| 2006/0130107 A1 * | 6/2006 | Gonder et al. | 725/110 |
| 2006/0159124 A1 * | 7/2006 | Henry et al. | 370/468 |
| 2006/0218604 A1 * | 9/2006 | Riedl et al. | 725/91 |
| 2007/0245391 A1 * | 10/2007 | Pont | 725/113 |

FOREIGN PATENT DOCUMENTS

| | | |
|---|---|---|
| WO | WO2004021668 A1 | 11/2004 |
| WO | WO 2006/057606 A1 | 6/2006 |

OTHER PUBLICATIONS

3rd Generation Partnership Project: Technical Specification Group Services and System Aspects: Transparent End-to-End Packet-Switched Streaming Service (PSS): Protocols and Codecs (Release 6) 3GPP TS 26.234 v6.8.0. Jun. 1, 2006.

Schulzrinne, H et al. Real Time Streaming Protocol. Draft-ietf-mmusic-rfc2326bis-08. IETF Internet Citation. Oct. 25, 2004.

* cited by examiner

MEDIA CHANNEL MANAGEMENT

This application claims the benefit of US Provisional Application No. 60/805,112, filed Jun. 19, 2006, the disclosure of which is fully incorporated herein by reference.

TECHNICAL FIELD

The present invention generally relates to management of media sessions in communications systems, and in particular to reducing the user-perceived time of switching media channels in such media sessions.

BACKGROUND

It has become a trend to offer and provide a vast range of new services in existing mobile networks and mobile communications systems. There is currently a very big interest in using mobile networks for multimedia or TV content. This is often referred to as Mobile-TV in the art. The goal for Mobile-TV applications is to offer a TV-like experience where the user can choose and easily zap between different multimedia or TV channels.

Ordinary TV channels are broadcasted to many users and typically the user can choose which channel to receive and view. Mobile-TV is similarly about delivering a set of (live) media or multimedia streams to several end-users. Each multimedia stream corresponds to a TV-channel, and each user shall be able to choose which channel to view. At the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H). These will be similar to traditional TV, in their broadcast distribution fashion.

In the meantime, until Mobile-TV based on multicast/broadcast is available, there is a need for solution that can be implemented over existing mobile transport channels. It will also later be of big interest for cells with few users and for networks with enough capacity, where unicast transport is the preferred distribution means.

A mobile TV-like service using streaming over Internet Protocol (IP) based networks can be implemented into existing mobile networks. An example is the Packet-Switched (PS) Streaming Service (PSS) developed in 3GPP. In order to start such a multimedia or TV session, a user typically surfs to a web page or portal and clicks on or selects a link to look at a live-streaming channel.

There also exist several proprietary streaming solutions that could be used for Mobile-TV, e.g. RealNetworks, Apple's Quicktime and Microsoft's media player. These also typically have a portal or web page where a link is clicked to start receiving a certain channel.

One of the goals of Mobile-TV services is to make it possible to zap between channels, as one can do for ordinary broadcasted TV channels. If all channels are broadcasted, the receiver can locally choose between channels by choosing the appropriate transport channel and using an appropriate demultiplexer. This is the case for standard cable, satellite or terrestrial television as well as the upcoming mobile standards MBMS and DVB-H. However, for unicast sessions, the client must instead influence a "server" or multimedia provider to send the desired channel.

The traditional way of doing IP-based mobile streaming is to choose a specified content in a browser. This starts the download of a Session Description Protocol (SDP) or a Synchronized Multimedia Integration Language (SMIL) file, which in turns initiates a Real Time Streaming Protocol (RTSP) streaming session in a media player of a user terminal. The approximate time it takes until a user sees the content on the screen of the user terminal is typically around or slightly over ten seconds of which maybe five seconds is application setup and the rest is signalling (around two seconds) and buffering (around three to four seconds). If the user wants to switch to another "multimedia or TV channel", he must stop the current data stream and go back to the browser where he chooses another channel by clicking a link. Then, a new RTSP session is started, the media player initiates and starts to buffer, and there is a new delay of about ten seconds.

In going beyond browser links for choosing a unicast channel, the simplest approach is to make an application which sets up a new streaming session to new URI (Universal Resource Identifier) every time one switches channel. This is quite general, but is quite slow in that a completely new RTSP signaling process must take place as well as a buffering of content.

In order to remedy this slow process, a much faster solution have been developed [1], where each user has a continuous streaming session and can initiate a channel switch by separate signaling over HTTP (Hypertext Transfer Protocol) or another protocol.

SUMMARY

A limitation of the procedure suggested in document [1] is that all channels must be encoded in a similar manner in order to make it possible to make one continuous RTP (Real-time Transport Protocol) session for each media stream.

The present invention overcomes these and other drawbacks of the prior art arrangements.

It is a general object of the present invention to provide an efficient media session management.

It is a particular object of the invention to provide media session management that allows for short channel switching times.

These and other objects are met by the invention as defined by the accompanying patent claims.

Briefly, the present invention involves management of a unicast-based media session involving a user terminal and a media server having access to multiple unicast-based media channels. A generic, channel-transparent session setup procedure is initiated by the transmission of a generic, channel-transparent session request from the user terminal to the media server. The setup procedure involves exchange of information in the form of channel-transparent requests and responses between the user terminal and the server. However, no media channel is selected during this setup procedure. This means that the media server is not yet aware of what channel the terminal would like to listen to and what media content the server should send to the user terminal.

First when the setup procedure is completed, the terminal notifies the media server of the requested media channel in the form of a channel-specific rendering request for that channel. The server can then start delivering media content of the channel using the transport mechanism and ports negotiated during the previous channel-transparent setup procedure.

If the user subsequently would like to switch to a new unicast-based channel at the server, the terminal simply transmits a new channel-specific rendering request but for the new channel to the server during the ongoing session. This means that the channel switch is taking place inside the session without any requirement of first ending the current session and then setting up a new media session. The transport mechanism and ports will therefore be reused also for the new channel. This will markedly reduce the channel switching time as fewer round trips and data processing at the server and terminal are required.

The present invention also allows for a seamless or near-seamless switch between unicast and broadcast delivery. The user terminal simply transmits a rendering pause request to the media server causing a temporary stop in the delivery of media content of the current unicast-based channel. The terminal can now listen to a broadcast channel. If the user anew would like to listen to the previous unicast-based channel or another unicast-based channel, the terminal transmits a new channel-specific rendering request for that channel. The media channel is therefore resumed without any new session setup procedure.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1A:
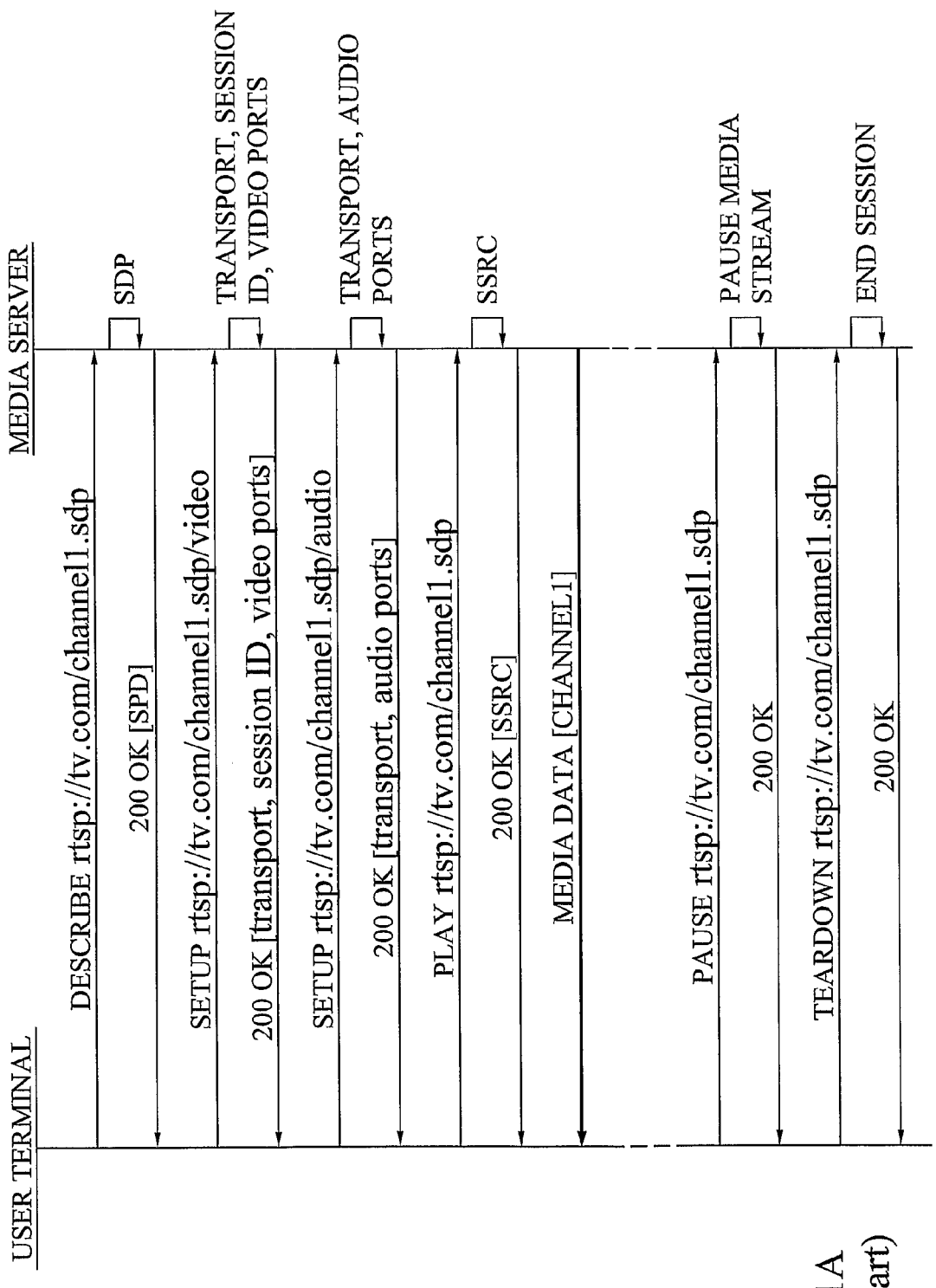
FIGS. 1A and 1B are signal diagrams illustrating a channel setup procedure and a channel switch procedure according to the prior art.

Throughout the drawings, the same reference characters will be used for corresponding or similar elements.

The present invention relates to media session management and in particular to managing a unicast-based media session. The session management of the invention reduces the number of round trips required for switching unicast-based media channels or for switching between unicast and multicast/broadcast channels as compared to the prior art techniques.

As a consequence of this reduction in round trip numbers, the user-perceived time of switching media channels becomes lowered, approaching "true" zapping levels. The present invention therefore provides a TV-like experience similar to the current ordinary TV system and the forthcoming multicast/broadcast based mobile-TV but in unicast-based communications system. The teachings of the present invention can be applied to any such unicast system and in particular wireless communications systems that employ the Internet Protocol, IP, for data communication. A typical example of such a communications system is a packet switched (PS) system that provides multimedia data to connected users through PS streaming (PSS). For more information of PSS reference is made to the document [2].

A media channel according to the present invention can, for instance, carry "live" media or consist of pre-recorded content consisting of one or more clips.

The channel switch of the invention will, from the user point of view, be much more smoothly experienced, will be performed in a shorter period of time and does not require visiting a multimedia provider's Web page nor setting up a new media session, as the prior art unicast solutions require.

Media or multimedia data according to the present invention includes any form and type of media that can be rendered and displayed at a user terminal. This includes, but is not limited, to images, video, audio and other media types that are capable of being perceived, during rendering, by a user.

Figure 1B:
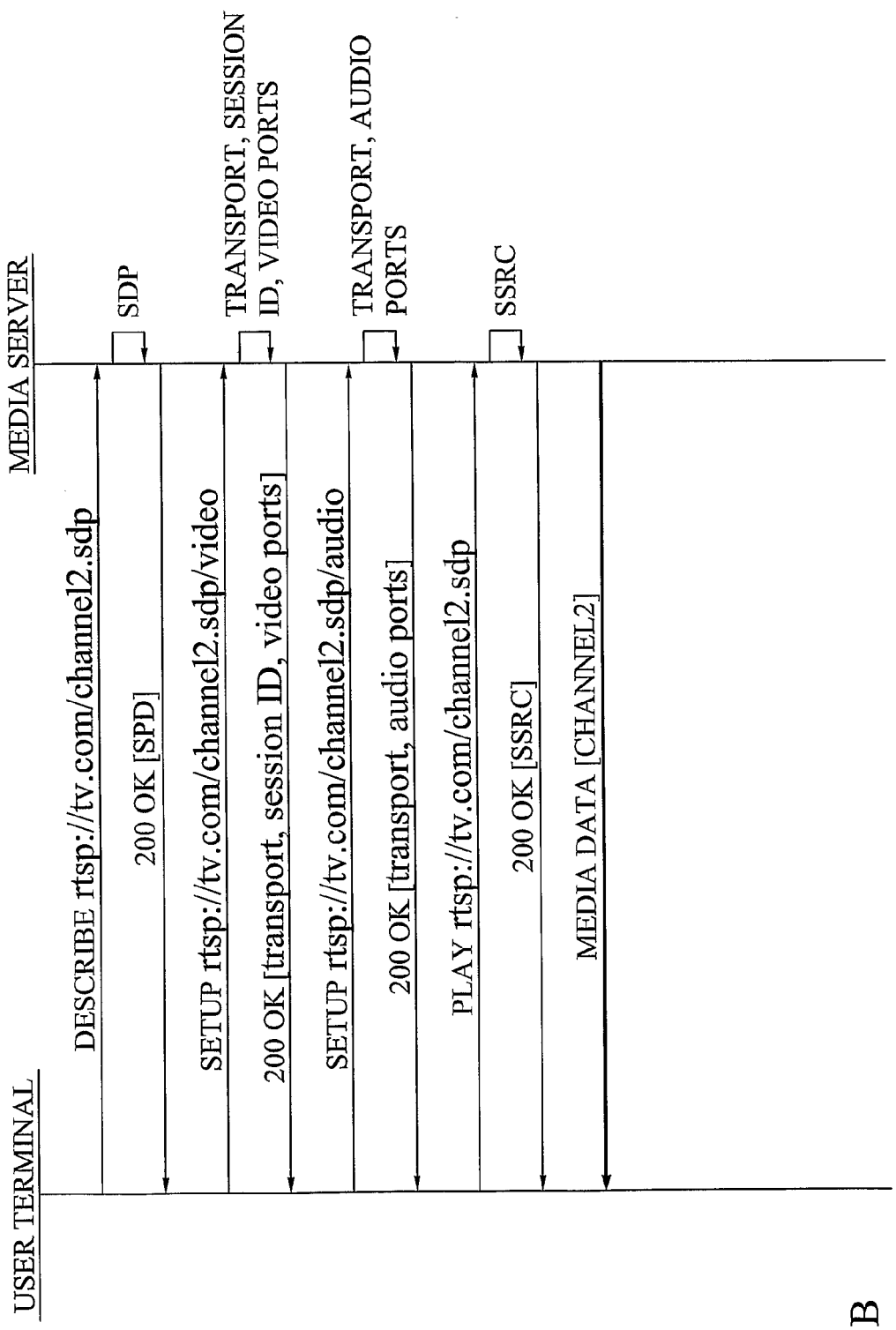

In order to simplify understanding of the present invention and the merits thereof, a brief review of the prior art techniques of setting up a unicast-based media session and switching media channels first follows in connection with FIGS. 1A and 1B. These figures illustrate the signaling performed during the setup and management of a Real Time Streaming Protocol (RTSP) session. As is known in the art, RTSP is an application-level protocol for control over delivery of media data with real-time properties. Today, different versions of RTSP are available, including RTSP 1.0 and RTSP 2.0. The present invention can be used in connection with both these versions and any other RTSP version.

The RTSP session may be initialized by the compilation and transmission of a DESCRIBE request at the user terminal. In response to the DESCRIBE request, the media server compiles and returns a response (200 OK message) comprising a description of the requested media content. The response typically comprises a Universal Resource Location (URL) of the media description at the media server. This response contains all media initialization information for the requested media content. In a typical implementation, the description is in the form of a Session Description Protocol (SDP) file. This SDP file comprises, among others, the name of the selected media, the transport address and available codecs for the media in addition to the URI of the description information.

A typical example of DESCRIBE response with a SDP file could be like:
RTSP/1.0 200 OK
CSeq: "session unique sequence number"
Date: "creation date and time"
Content-Type: "content type of file contained in response"
Content-Length: "file length"
The above four lines constitutes headers in the RTSP response. The following lines illustrate an example content of the SDP file:
v=0 "start of SDP file"
o="creator"
s="session name"
i="session information"

u="URI of description"
e="email address"
c="connection information"
t="time the session is active"
a=control:* "control line used on session level, * specifies that the control URI is the same as used for DESCRIBE"
a=control:audiotrack "control line for audio media with a relative URI"
m=audio 3456 RTP/AVP 0
a=control:videotrack "control line for video media with a relative URI"
m=video 2232 RTP/AVP 31

A typical example of the communication between the user terminal (UE) and the media server (MS) could then be:
UE→MS request:
DESCRIBE rtsp://mediaserver.com/movie.test RTSP/1.0
CSeq: 1
MS→UE response:
RTSP/1.0 200 OK
CSeq: 1
Date: 28 Feb. 2006 15:35:06 GMT
Content-Type: application/sdp
Content-Length: 435
v=0
o=−950814089 950814089 IN IP4 144.132.134.67
s=Example of aggregate control of AMR speech and H.263 video
e=foo@bar.com
c=IN IP4 192.168.30.29
b=AS:77
t=0 0
a=range:npt=0-59.3478
a=control:*
b=AS: 13
a=fmtp:97 mode-set=0,2,5,7; maxptime=200
a=control:streamID=0
m=video 0 RTP/AVP 98
b=AS:64f
a=rtpmap:98 H263-200/90000
a=fmtp:98 profile=3; level=10
a=control:streamID=1

For more information of SDP file, reference is made to the document [3].

The user terminal thereafter compiles and transmits a SETUP request for the Universal Resource Identifier (URI) of the desired media content. A typical media session involves both video and audio content transmitted over a unicast-based media channel. In such a case, the SETUP procedure is performed stepwise for the two content types. For example, the video SETUP request can first be transmitted, comprising the URI of the video content. The request also comprises an indication of the transport parameters acceptable to the user terminal for the media data transmission. These parameters include in particular the client input ports used for the video content. The media server generates, in response to the SETUP request, a session identifier to be used henceforth as an identifier of the current media session. This session identifier is returned together with the transport parameters selected by the server and the video output ports of the server.

A corresponding audio SETUP request and response are communicated between the user terminal and the media server for negotiating audio transport parameters. In clear contrast to the video SETUP message, the audio SETUP request comprises the notified session identifier.

The RTSP session is now successfully setup and the actual media content delivery can be started. The user terminal therefore compiles a PLAY request telling the server to start sending the notified media content via the transport mechanism negotiated during the session setup. The PLAY request may specify a range where the normal play time should be begin or a time parameter specifying a time at which the playback or rendering of the media should start. The media server processes this PLAY request and responds with acknowledged time parameter or range and synchronization information, such as in terms of rtptime in the rtp-information field of the response.

The requested media can then be delivered on the unicast-based media channel using the determined transport mechanism.

If the user subsequently would like to switch to a second unicast-based channel, the current RTSP session must first be ended. This can be implemented by transmitting a PAUSE request comprising the media URI and session identifier to the media server. This causes a temporary interruption of the delivered media stream. However no allocated resources for the stream are freed at this point. The user terminal continues by transmitting a TEARDOWN request to stop the stream delivery for the given URI, freeing the resources associated with it. This ends the current media session. For more information of RTSP, reference is made to the document [4].

The user terminal is then forced to setup a new RTSP session but for the new media channel as illustrated in FIG. 1B. Thus, the same procedure as was described in the foregoing is once more conducted but with URI of the new media content and with a new session identifier. The channel switch, thus, involves extensive signaling taking six round trips as well as some processing delay in the media server and the user terminal before being able to render the media content of the new media channel.

The present invention reduces this extensive signaling in connection with channel switching by choosing media channel via a channel-specific rendering request (RTSP PLAY request) and a generic, channel-transparent session setup procedure.

Figure 2:
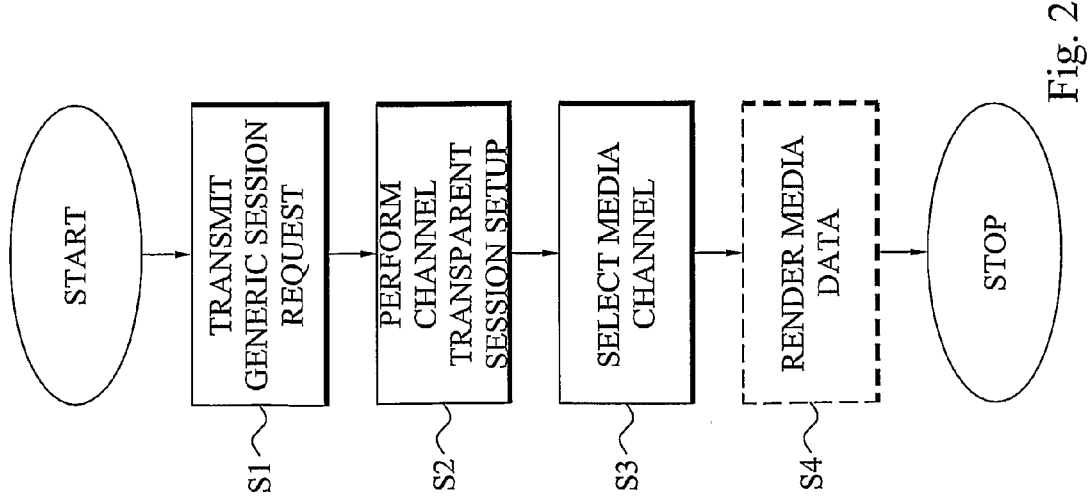
FIG. 2 is a flow diagram illustrating a method of managing a unicast-based media session according to the present invention.

FIG. 2 is a flow diagram of a method of managing a unicast-based media session involving a user terminal (client) and a media server providing multiple, i.e. at least two, different media channels. The starts in step S1, where the user terminal generates and transmits a generic, channel-transparent session request to the media server. This session request thereby does not select a specific media content or media channel. Thus, at this point the media server is not yet notified of which media content the user terminal requests. Upon reception of the channel-transparent session request, the media server and the user terminal perform a generic, channel-transparent media session setup procedure in a next step S2. This setup procedure is conducted based on the previously generated and transmitted session request. Thus, this step S2 basically involves setting up an RTSP session between the user terminal and the server. However, in clear contrast to the prior art, this session set-up procedure does not involve any specification of the media content to subsequently be delivered to the user terminal. Thus, information is exchanged between the user terminal and the media server, such as transport parameters negotiation and session identifier notification. However, this information exchange is performed without any explicit or implicit selection of media channel to use for the media session. This means that the actual media content/channel selection is postponed until the session setup procedure has been finished.

The notification of the desired media channel and content is taking place first once the generic, channel-transparent media session has been successfully setup. At this point, the user terminal generates and transmits a channel-specific rendering request for the desired channel to the media server in step S3. First now the server becomes aware of which particular media content the user terminal requests and therefore starts delivering media data of the requested channel using the negotiated transport mechanism. As the terminal receives the media data its media player starts rendering or playing back the content on the terminal for its user in step S4. This data rendering typically involves displaying video content on a display screen of or connected to the user terminal and playing audio content on loudspeakers of or connected to the terminal.

The method then ends. In the following different scenarios describing the generic, channel-transparent session setup procedure will be described in more detail in connection with the signal diagrams of FIGS. 3 to 5. In these diagrams, the media session is performed as an RTSP session and therefore the terminology of such RTSP requests and responses have been employed in the figures. The teachings of the present invention could though be applied other protocols used for setting up and managing a unicast-based media session.

Figure 3:
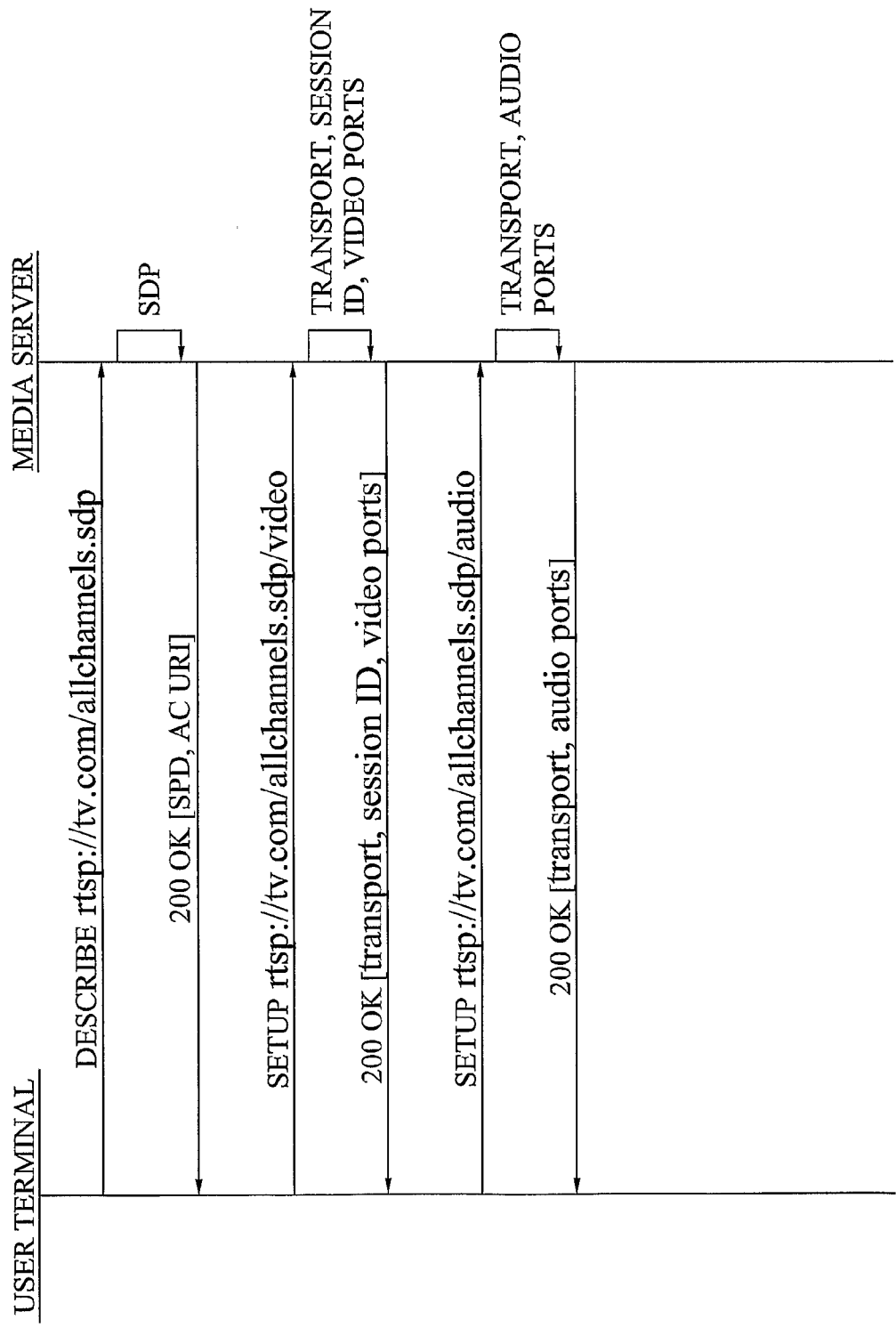
FIG. 3 is a signal diagram illustrating a channel-transparent session setup procedure according to an embodiment of the present invention.

FIG. 3 is a signal diagram illustrating performing the generic, channel-transparent media session setup procedure according to an embodiment of the invention. The setup is initiated by the transmission of the generic, channel-transparent session request message to the media server. This request message could be a DESCRIBE request, if employed, or a SETUP request. In this and the following figures, DESCRIBE requests and responses have been employed but the invention could also be applied to a procedure without these requests and responses.

The DESCRIBE request does not specify the actual channel as in the art (rtsp://tv.com/channel1.sdp in FIG. 1A and rtsp://tv.com/channel2.sdp in FIG. 1B). In clear contrast, the request is generic in terms of that it requests description of multiple, preferably, all media contents available through unicast-based delivery from the media server.

The media server generates a description message or fetches a pre-generated such message based on the received DESCRIBE request. This DESCRIBE response is preferably in the form of a SDP file or some other message format. This SDP file comprises an announcement of the available media channels their media contents. In the line with the previously listed example of prior art SDP file, the SDP file returned in the DESCRIBE response could be in the form of:
RTSP/2.0 200 OK
CSeq: 1
Date: "creation date and time"
Content-Type: allchannels/sdp
Content-Length: "file length"
v=0
o="creator"
i="session information"
u="URI of description"
t="time the session is active
a=control:tv.com/allchannels.sdp/channel1
a=control:tv.com/allchannels.sdp/channel2
....
a=control:tv.com/allchannels.sdp/channelN This means that the SDP description is supplemented with multiple session control lines, where each such line announces one of the available media channels. In an alternative approach, a new attribute "altcontrol" is introduced in the SDP file. This means that the control attribute is kept for backwards compatibility.

The corresponding media line in the SDP file may then look like:
a=altcontrol: list channel1
a=altcontrol: list channel2
...
a=altcontrol: list channelN In both these embodiments, the media channel announcements could be in the form of so-called aggregated control (AC) URIs. Such an AC URI relates both to video content and the associated audio content to be rendered together in a user terminal. In an alternative approach for media content comprising both video and audio, separate URIs could be used in the control or altcontrol lines for the two media types per each available media channel.

In the case of backwards compatibility, the SDP file may be supplemented with a control attribute line in addition to the altcontrol attribute, i.e.
a=control: defaultchannel
a=altcontrol: list channel1
a=altcontrol: list channel2
...
a=altcontrol: list channel The default channel could then be a pre-defined default channel selected by the media server and used as initial media channel for those user terminals that does not support the altcontrol attribute. In such a case, these user terminals can continue the session setup procedure according to the prior art with this default channel.

In order to give the signaling a fallback, the session request can include a support request whether the media server supports the generic, channel-transparent setup procedure. This can be implemented by using a feature tag with the require header in the first DESCRIBE request transmitted by the user terminal. This header could then include a new attribute multiple-control-uris:
DESCRIBE rtsp://tv.com/allchannels.sdp RTSP/2.0
Require: multiple-control-uris If the server does not support the generic setup procedure, it can respond with an error message, such as 551 Option not supported.

Once the user terminal has received the description message with the preferred AC URIs, it generates a generic, channel-transparent transport or setup request message. In line with the discussion in connection with FIG. 1A, if a media channel comprises both video and audio content, a generic, channel-transparent setup request is preferably compiled and transmitted for both content types as is shown in FIG. 3. A first such generic, channel-transparent request could be for the video (audio) content, whereas the second request is then dedicated for audio (video) content. The requests preferably specify the transport parameters acceptable to the user terminal for the subsequent media transmission. For example, they include the notifications of the input video and audio ports of the user terminal and other transport parameters required for setting up the media session.

This generic setup request message typically triggers, upon reception at the media server, transport mechanism negotiation (offer-answer procedure) and session identifier generation. The media server, thus, includes information of the transport parameters selected by the server, the generated session identifier and the output video and audio ports, respectively, to be used for the subsequent media delivery, in the responses.

This procedure is, thus, preferably repeated for the audio content if the first SETUP request and response related to video content. As was noted in the foregoing, once the session identifier has been generated and notified to the user terminal, it is preferably included in all subsequent communications between the user terminal and the media server.

The generic, channel-transparent media session of the invention is now set up. This means that required input and output ports have been selected and notified, transport parameters have been negotiated and session identifier have been generated. All these procedures have though been conducted without any specification or selection of the particular media channel to use in the session.

In the embodiment described above in connection with FIG. 3, the AC URIs of the different available media channels are notified to the user terminal in the description message (SDP file of DESCRIBE response). However, it could be possible that these URIs, i.e. media channel identifiers, are not known when the SDP file was created. Furthermore, the availability of the media channels may depend on the time of the day or may different from different days. The usage of a fixed pre-defined SDP file will therefore be too inflexible to cope with this situation. A possible solution could then be to generate a new SDP file at the media server each and every time it receives a DESCRIBE response. However, this increases the data processing requirements of the media server and introduces further delays in the media session setup procedure.

An alternative approach is instead to use generic templates in the SDP file and then inform the user terminal of the relevant media channel URIs at a later point in the setup procedure. This approach has been taken in FIGS. 4 and 5.

Figure 4:
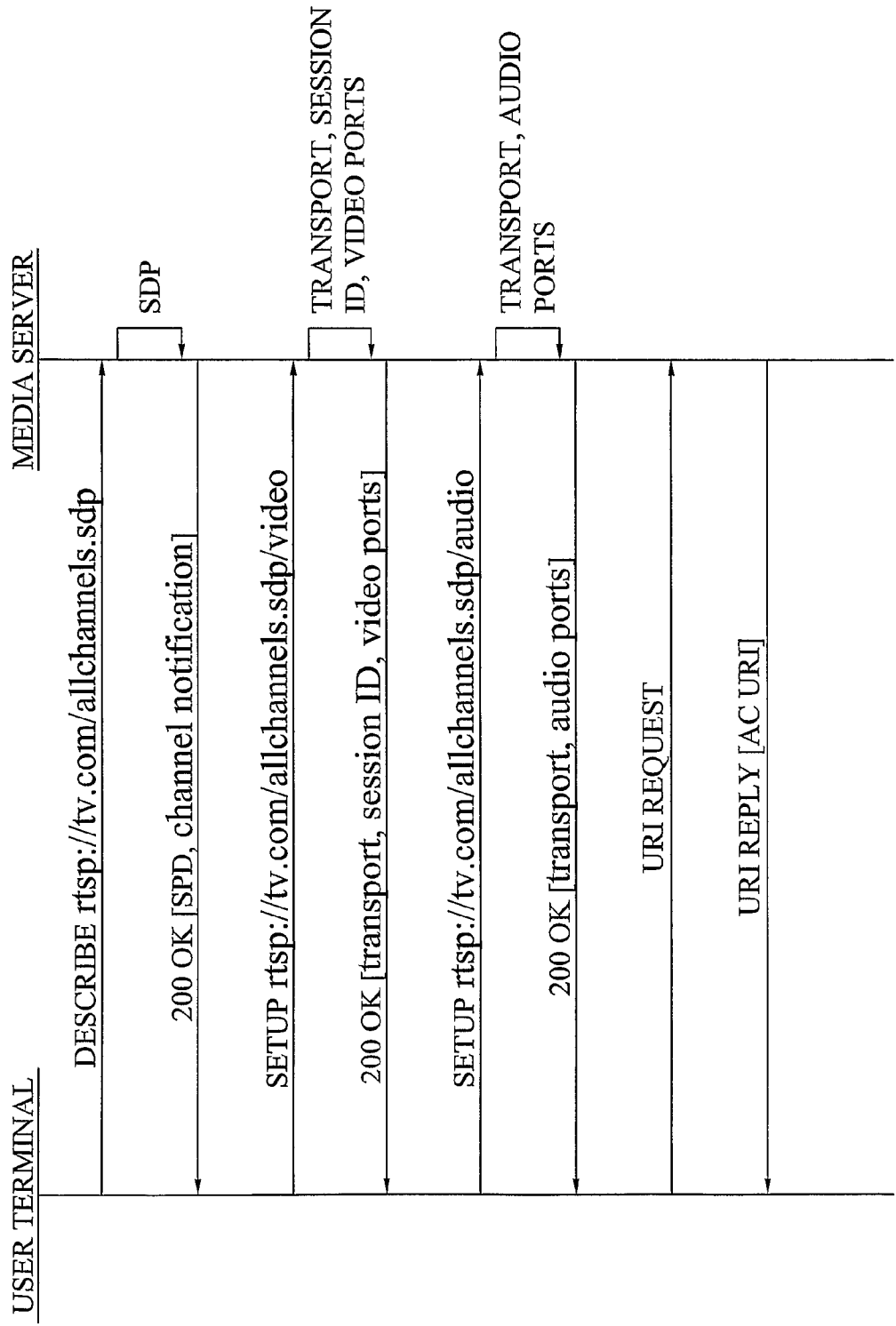
FIG. 4 is a signal diagram illustrating a channel-transparent session setup procedure according to another embodiment of the present invention.

FIG. 4 is a signal diagram illustrating performing the generic, channel-transparent media session setup procedure according to another embodiment of the invention. The setup is initiated by the transmission of the generic, channel-transparent session (DESCRIBE) request message to the media server. Upon reception of this message, the media server provides an SDP file or other description message comprising a generic announcement of the available media channels. This announcement can be used in connection with the control attribute:
a=control:tv.com/allchannels/*
or the new altcontrol attribute:
a=altcontrol:dynamic This signals that the list of alternative AC URIs is dynamic or unknown at the particular moment and will be provided by other means. In augmented Backus-Naur form (ABNF) syntax, see document [5], the session part of the SDP file may be written as:
altcontrol-line="a=altcontrol:" control-type [sp rtsp-URI]
control-type="list"/"dynamic"/token
rtsp-URI="specified as in RTSP 2.0"

The actual meaning of each control line can also be provided in the SDP file but may be better defined in a complete channel table that describes unicast channels or both unicast and broadcast channels.

The remaining SETUP request and response signaling is performed in the same generic, channel-transparent manner as was described above in connection with FIG. 3.

The user terminal will then compile and transmit a request for the AC URIs that were dynamically/generically announced in the SDP file. This request can be sent to the media server or even another server or node in the communications system having access to information of the currently available unicast media channels at the media server and their respective URIs. The request could for example be in the form of a regular HTTP request or a request for a complete channel table. The media server or the other server/node responds to this request by returning information of the URIs of the unicast-based media channels currently available at the media server.

Figure 5:
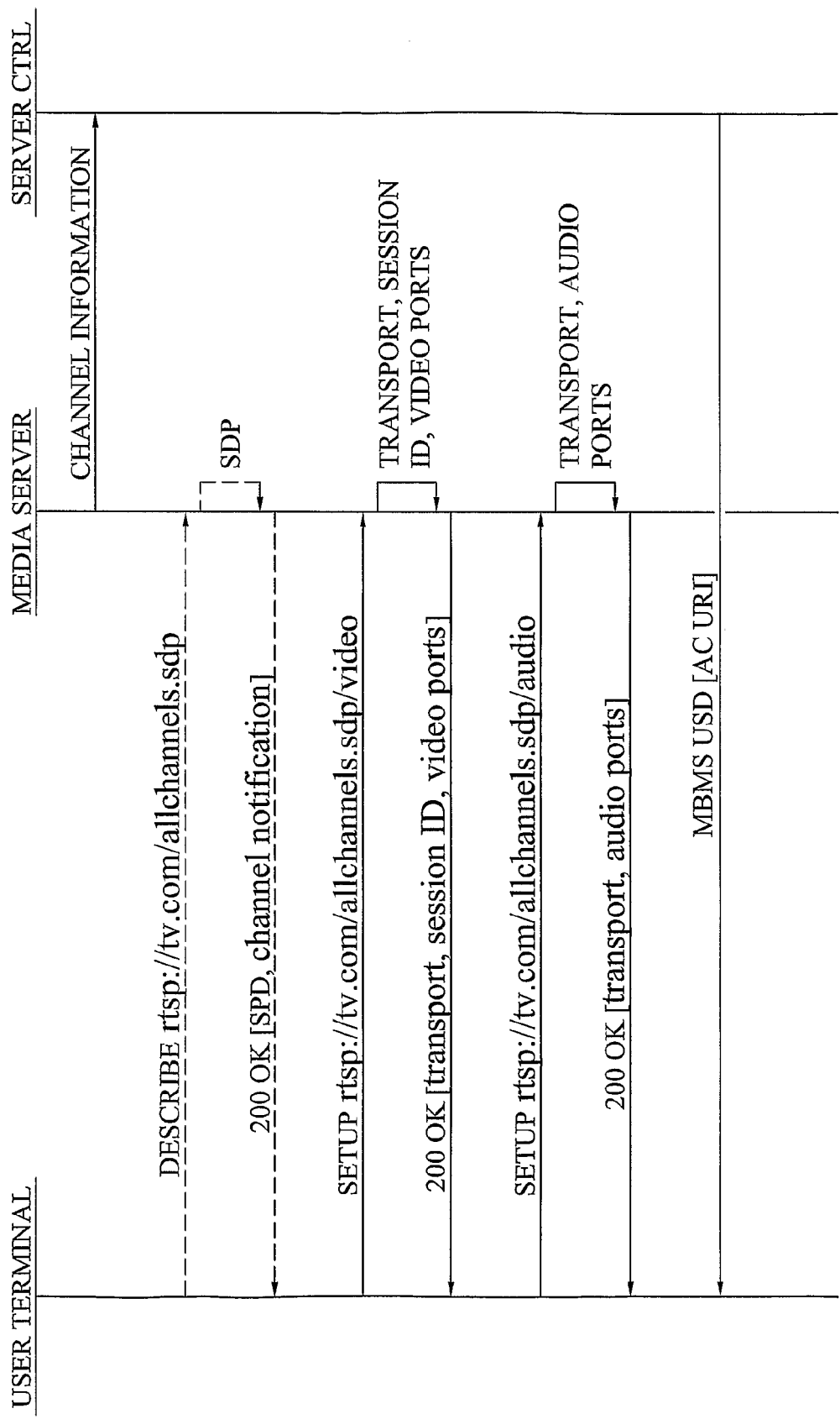
FIG. 5 is a signal diagram illustrating a channel-transparent session setup procedure according to a further embodiment of the present invention.

In another approach, the URI notification is performed through a broadcast or multicast transmission from the media server or some other server or node. This situation is schematically illustrated in FIG. 5. In this signal diagram, a separate server controller performs the AC URIs notification in the form of a broadcast/multicast user service description (USD). The media server has previously informed the server controller of its different unicast-based channels, their availability and URIs.

As was described in the foregoing, the generic, channel-transparent media session setup procedure of the invention does not necessarily have to be initiated by the transmission of the DESCRIBE request. This is illustrated further in the present figure as the dashed lines may be omitted. As a consequence, the setup procedure can be initiated directly by the transmission of a generic, channel-transparent SETUP request message from the user terminal. The following signaling up to the last SETUP response is similar to what has been previously described in connection with FIG. 3.

The user terminal is here informed of the AC URIs of the media channels currently available at the media server through the USD broadcasting or multicasting from the server controller. The USD message does not necessarily have to be sent after completion of the channel-transparent setup procedure. This means that the user terminal can instead have received the USD (shortly) before the initiating the setup procedure or at some time during the setup procedure. In such a case, the server controller could be configured for periodically broadcasting or multicasting the USD at suitable time intervals.

It is anticipated by the present invention that a combination of the signaling disclosed in any of FIGS. 3 to 5 can be used and is within the scope of the invention. For example, it possible to combine URI notification in the SDP file with URI broadcasting, in the case an updating of the available media channels is eminent.

Figure 6:
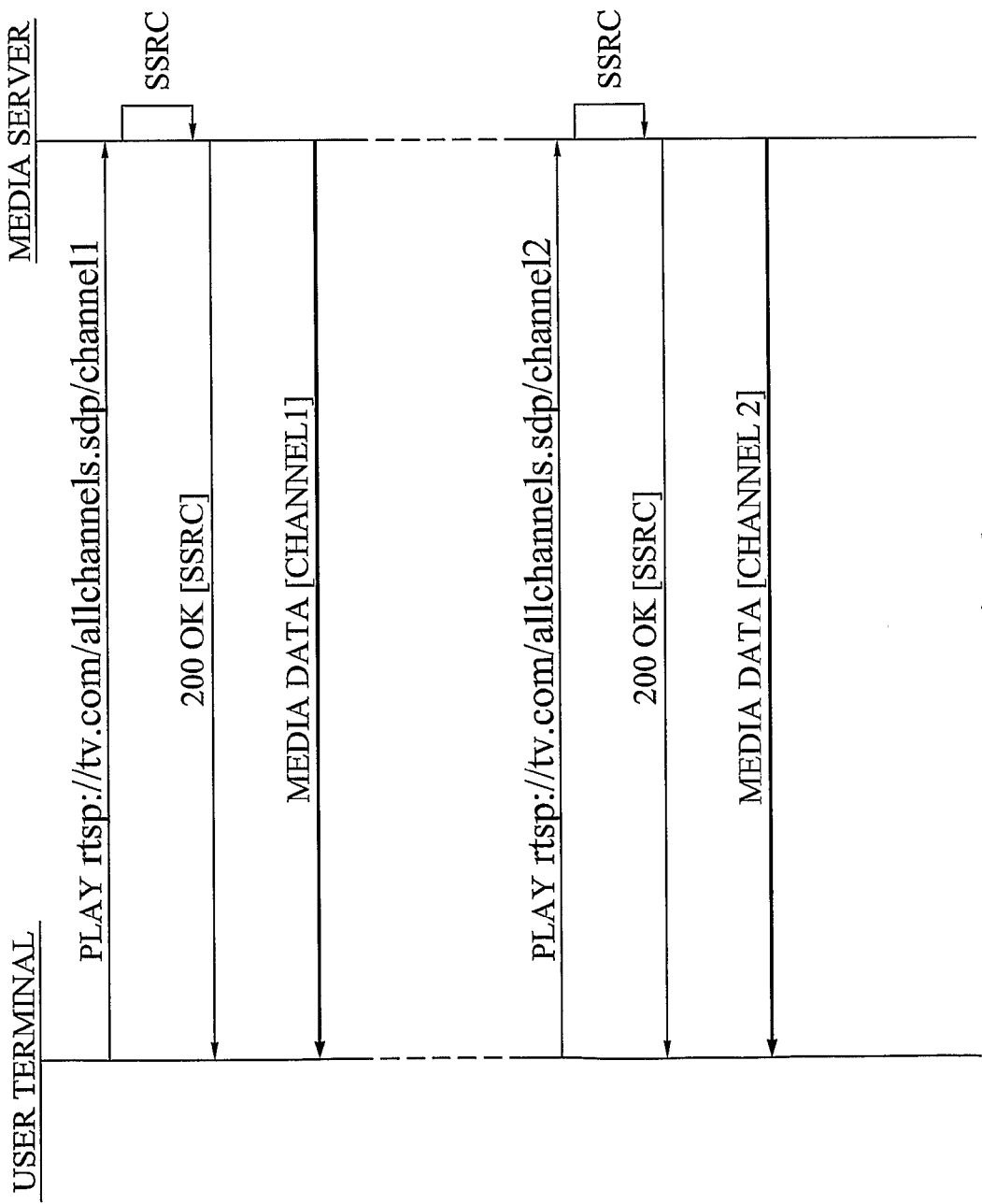
FIG. 6 is a signal diagram illustrating a channel request procedure and a channel switch procedure according to an embodiment of the invention.

The media session has now been setup in the generic, channel-transparent manner without any selection of media channel that the user terminal actually should listen to during the session. The media channel and therefore media content selection of the invention is taking place first at the compilation and transmission of a rendering request, e.g. RTSP PLAY request as is illustrated in FIG. 6. This PLAY request comprises an identifier of the selected media channel. The request is preferably generated based on the unique media resource identifier (URI) associated with the selected media channel and previously received at the user terminal. Preferably, the rendering request comprises the AC URI of the selected media channel.

The media server processes the PLAY request and responds with acknowledged time parameter or range and synchronization information, such as in terms of rtptime in the rtp-information field of the response.

The media content of the requested channel is then transmitted using the transport mechanism, input and output ports determined in the generic, channel-transparent setup procedure, to the media content.

If the user terminal subsequently would like to switch to any of the other unicast-based media channels provided by the media server and earlier notified to the terminal in connection with the setup, the terminal simply compiles and transmits a new rendering request, i.e. PLAY request, for the new media channel. This channel-specific PLAY request is preferably generated based on the AC URI of the new channel and more preferably comprises the AC URI or some other identifier of the new channel. The PLAY request is furthermore generated based on a user input, such as the pressing of a key, touch sensitive screen or some other input activation, on the terminal.

The media server replies with a rendering response including synchronization and time information. As the PLAY response provides the synchronization information as well as values for the SSRC fields, the decoder at the terminal can start playing the new channel and identify the data packets. The media content of the new channel is transmitted using the same output ports of the server to the same input ports of the user terminal as employed for the previous channels. The other transport parameters determined during the channel-transparent setup procedure are typically kept.

It is anticipated by the invention that this second PLAY request preferably comprises, as the first PLAY request preferably did, the session identifier assigned during the generic session setup procedure.

In a preferred implementation, new synchronization values (SSRC) are sent for all media streams and channels. The PLAY response from the media server could then have the following layout:
RTSP/2.0 200 OK
RTSP-Info: URI="rtsp://tv.com/allchannels.sdp/audiotrack" ssrc=0D12F123: seq=5712; rtptime=93407921, URI="rtsp://tv.com/allchannels.sdp/
videotrack"ssrc=789DAF12: seq=57654; rtptime=2792482193

The fast channel switch of the present invention, thus, utilizes a rendering request, such as RTSP PLAY request, inside an ongoing media session, such as RTSP session, to request a new channel. As a consequence, all those parameters negotiated and determined during the generic, channel-transparent setup of the invention can be kept also for the delivery of the new media content. This should be compared to the prior art switching, where the current RTSP session first have to be stopped and torn down and a completely new channel-specific RTSP session must be setup before the media content of the new channel can be delivered to and rendered on the user terminal. By comparing FIG. 6 with the situation in FIGS. 1A and 1B it is clear that about six round trips and the processing in connection with that signaling is no longer necessary for switching media channels. As a consequence, the channel switching of the invention becomes much faster than the prior art switching.

The actual design of the rendering request of the invention is not decisive. An example could be as:
PLAY rtsp://tv.com/allchannels.sdp/channel2 RTSP/2.0
where "tv.com/allchannels.sdp/channel2" is the AC URI of the media channel number 2.

An alternative approach is to use:
PLAY rtsp://tv.com/allchannels.sdp?channel=2 RTSP/2.0
where a query part is used to the base URI "tv.com/allchannels.sdp" and "2" is an identifier of the requested channel.

Instead of using a unique URI, preferably AC URI, per media channel, it could be possible to use identical URIs for all uncast-based media channels but add some information to distinguish between the channels. For example, a new header can be introduced. In such a case, a PLAY request could be as:
PLAY rtsp://tv.com/allchannels.sdp RTSP/2.0
x-channel: "identifier of requested channel".

The identifier could simply be a numerical number, 1, 2, 3, and so on, or some other name or identifier, including MBMS user service identifier.

The channel switching of the present invention has a further advantage compared to the prior art in addition to the reduced switching time and fewer round trips and processing in connection with the switch. The present invention can be used for providing a transition between a unicast channel and a broadcast/multicast channel and vice versa.

Figure 7:
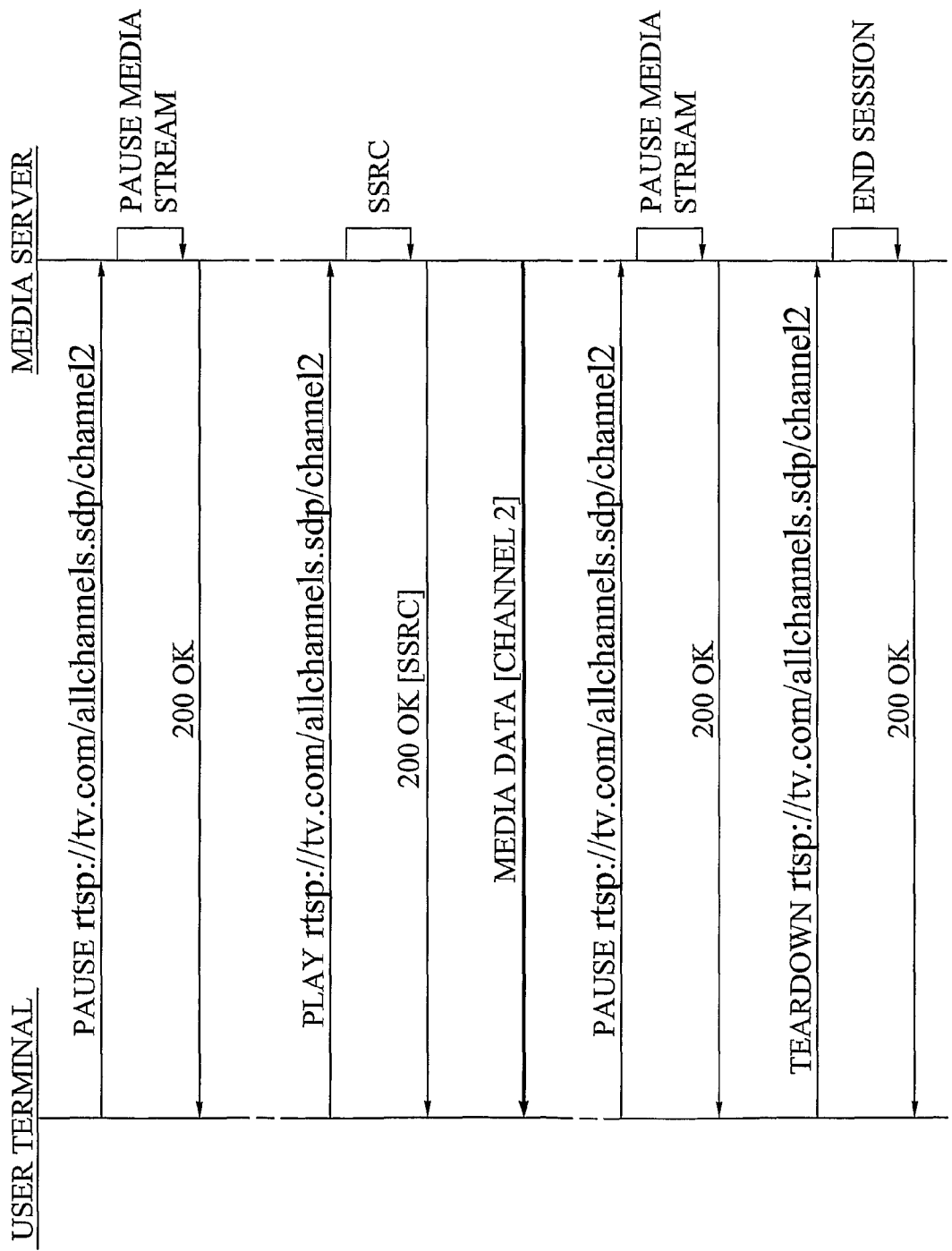
FIG. 7 is a signal diagram illustrating a procedure for temporary pausing and a procedure for ending a unicast-based media session of the present invention.

If the user would like to switch from the current unicast-based channel to a broadcast channel, the delivery of the current media content is temporarily paused. FIG. 7 is a signal diagram of an embodiment of the invention providing such a unicast-broadcast transition opportunity.

Once the user terminal receives a user input to switch to a broadcast channel, the terminal compiles a rendering pause request, such as a RTSP PAUSE request. This request is a traditional PAUSE request as was described in connection with FIG. 1A. The media server responds by pausing the transmission of media data of the current unicast-based channel and preferably replies with a PAUSE reply or response.

The user terminal then starts listening to the broadcast channel and receives the media data of that channel. This broadcast channel can be provided by the same media server or some other media server in the communications system.

If the user subsequently would like to return to listen to the previous unicast-based media channel or listen to another unicast-based channel provided by the media server, the user terminal compiles and transmits a new channel-specific rendering request, i.e. PLAY request, to the media server. The media server replies with a PLAY response and media data of the selected unicast-based channel is transmitted to the user terminal using the previously negotiated transport mechanism and ports.

This means the unicast-based media session is not ended during the temporary switch to the broadcast channel. In contrast, the session is dormant and becomes active again upon a new rendering request.

The switch from unicast to broadcast access or vice versa for the same content can be made seamless if, for a short while during the switch, the user terminal receives two media data streams in parallel. This means that during this short period of time, the user terminal receives media content from both the old (unicast or broadcast) channel and the new (broadcast or unicast) channel. The user terminal will then switch source before the RTP buffer.

In order to make such a seamless transition reliable, the transport delay is preferably small between unicast and broadcast. Optimally, the two streams would be identical or completely synchronized. In such a case, the switch can be made anywhere in the stream. Otherwise, media content from both streams are typically received in parallel for a short period of time in the user terminal and the switch is taking place at an intra frame. This reduces the risk of missing data packets containing media data.

The different unicast and broadcast channels provided by the media server could use different encodings and codec settings. This can be solved by, for example, describing the different encodings/settings in the description file (SDP file) and give them different payload type values. Upon a channel switch, the user terminal will switch decoder configuration on the fly on receiving the data packets of the new channel. It is also possible to utilize different encodings for different unicast-based channels.

The invention is also very flexible as it makes it possible to use the same media stream for both unicast and broadcast without changing any RTP header fields. This simplifies the seamless transition from unicast to broadcast during the ongoing media session, in particular in combination with usage of the same encryption of the streams.

The generic, channel-transparent setup procedure of the invention can be performed even if the user first would like to listen to a broadcast channel. This means that the unicast-media session is setup but then becomes dormant until the user terminal stops listening to the broadcast channel and transmits a PLAY request to the media server. This means that the first channel-specific rendering request of the invention not necessarily has to be transmitted directly following the completion of the channel-transparent setup procedure. Instead the rendering request is first transmitted once the user wants to switch from broadcast to unicast channels.

If the user terminal subsequently would like to end the current media session, the previously described procedure with PAUSE and TEARDOWN requests and responses is performed.

The session identifier that the media server preferably generates in connection with the reception of the (first) generic, channel-transparent SETUP request is preferably used by both the media server and the user terminal in all subsequently communicated requests and responses. This means that the session identifier is preferably included in a subsequent rendering request used for switching unicast channels. In addition, the rendering request reactivating the media session following a temporary listening, at the user terminal, of a broadcast channel also preferably comprises this session identifier.

The generic, channel-transparent session setup procedure of the invention does not necessarily have to follow the signaling described in connection with FIGS. 3-6. In an alternative approach a pipelining of the RTSP requests and replies could be possible. In such a case, the user terminal compiles and transmits the channel-transparent video and audio SETUP requests followed by the channel-specific PLAY request. This means that the terminal does not await any replies to the previously transmitted request before transmitting the next. The media server responds by sending the video SETUP response, the audio SETUP response and the PLAY response one after another or indeed together. Media data of the media channel requested first at the PLAY request is then delivered to the user terminal.

In this pipelining embodiment, the session identifier will be notified to the user terminal first after the channel-transparent setup procedure has been ended and the requested media channel has been requested. In order to identify the user terminal and the current session, the terminal preferably generates a unique temporary identifier and includes it in the SETUP and PLAY requests. This allows the media server to determine that these requests originate from one and the same user terminal. Once the terminal has received the session identifier from the media server, typically in the first SETUP reply, it will use this session identifier instead of the temporary identifier in any subsequent PLAY requests when switching media channels.

Figure 8:
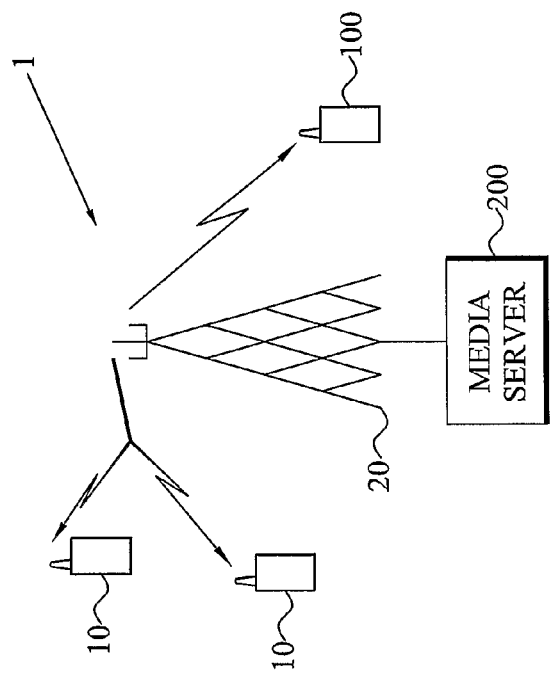
FIG. 8 is a schematic overview of a portion of a communication system, to which the teachings of the present invention can be applied.

FIG. 8 is a schematic overview of a unicast-based wireless communications system 1 according to an embodiment of the present invention. The communications system 1 comprises a base station or network node 20 transmitting media content to connected user terminals 10, 100. This base station 20 comprises or is connected to a media server 200 of the invention having multiple available unicast-based media channels. In the figure, a first user terminal 100 listens to one of these unicast-based media channels. Two other user terminals 10, however, listen to a broadcast channel also being available at the media server 200.

Figure 9:
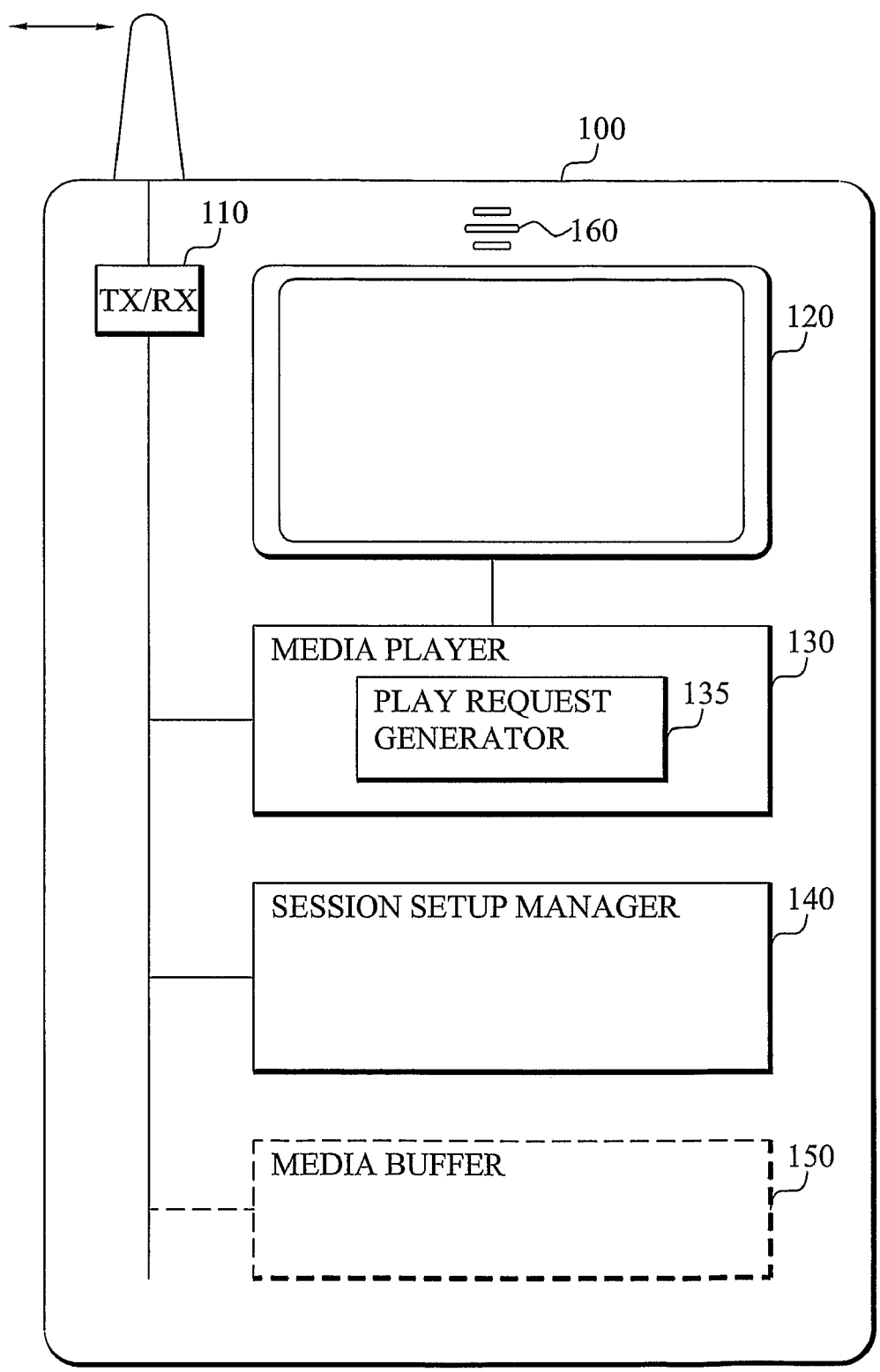
FIG. 9 is a schematic block diagram of a user terminal according to the present invention.

FIG. 9 is a schematic block diagram of a user terminal 100 according to an embodiment of the present invention. This user terminal 100 comprises a transmitter and receiver or transceiver 110, schematically illustrated as a single unit in the figure. The unit 110 includes traditional transmitter/receiver functionality, such as modulator/demodulator, encoder/decoder, etc.

The transmitter 110 is adapted for transmitting, to a media server, the generic, channel-transparent requests during the channel-transparent session setup procedure and the channel-specific rendering request signaling the start of media delivery and/or a channel switch. The receiver 110 is adapted for receiving the responses to the requests transmitted by the transmitter chain 110 and, of course, the streamed media data from the media server.

The user terminal 100 comprises a session setup manager 140 that constitutes a means for performing a generic, channel-transparent unicast-based session setup procedure with the media server. This setup manager 140 thus compiles the channel-transparent request messages that are transmitted by the transmitter 110 to the media server and processes the corresponding response messages received by the receiver 110. The channel-transparent setup procedure involves exchange of information between the user terminal 100 and the server but no explicit selection of media channel to use until the session is setup. The manager 140 performs this setup procedure with the media server based on the generic, channel-transparent session setup request (DESCRIBE or SETUP request) transmitted by the transmitter.

A rendering or play request generator 135 is implemented in the user terminal to compile a channel-specific rendering request once the setup manager 140 has completed the channel-transparent setup procedure with the media server. This request message comprises an identifier of the selected media channel, such as an AC URI or other channel identifier. The compiled rendering request is forwarded to the transmitter 110 that forwards it media server for starting the media delivery.

The setup manager 140 and the request generator 135 are typically activated through a user input (not illustrated) of the terminal 100. This will cause the generation of the request messages of the invention and their transmission to the media server.

The request generator 135 is also activated, by the triggering or activation of a user input, during a switch to another unicast-based channel or upon returning to listening to a unicast-based channel following a temporary period of broadcast channel listening. Thus, at a channel switch during the ongoing session, the request generator 135 compiles a rendering request for a new media channel, which request preferably comprises an identifier of that channel. Correspondingly, at a switch to broadcast listening, the play request generator 135 compiles a rendering pause request that is transmitted by the transmitter 110 to the media server. If the user wants anew to return to the previous unicast-based channel or another such unicast-based media channel, the request generator 135 composes a channel-specific rendering request with an identifier of that media channel.

The request generator 135 can be implemented in a multimedia or media player 130 of the user terminal 100. This media player 130 is preferably in communication with a display screen 120 and a loudspeaker 160 of the terminal 100 for displaying and playing out the media thereon.

An optional media buffer 150 may be implemented in the user terminal 100 for temporarily storing received media data before it is rendered by the media player 130 at the screen 120 and/or the loudspeaker 160. This buffer 150 is useful in the case of channel switching and in particular for unicast-to-broadcast or broadcast-to-unicast switching as the two media streams can be received in parallel and stored in the buffer 150 for allowing a seamless channel transition.

The units 110, 130, 135 and 140 of the user terminal 100 may be provided as software, hardware or a combination thereof. The play request generator 135 can be implemented in the media player 130 as is illustrated in the figure or in another location in the terminal 100.

Figure 10:
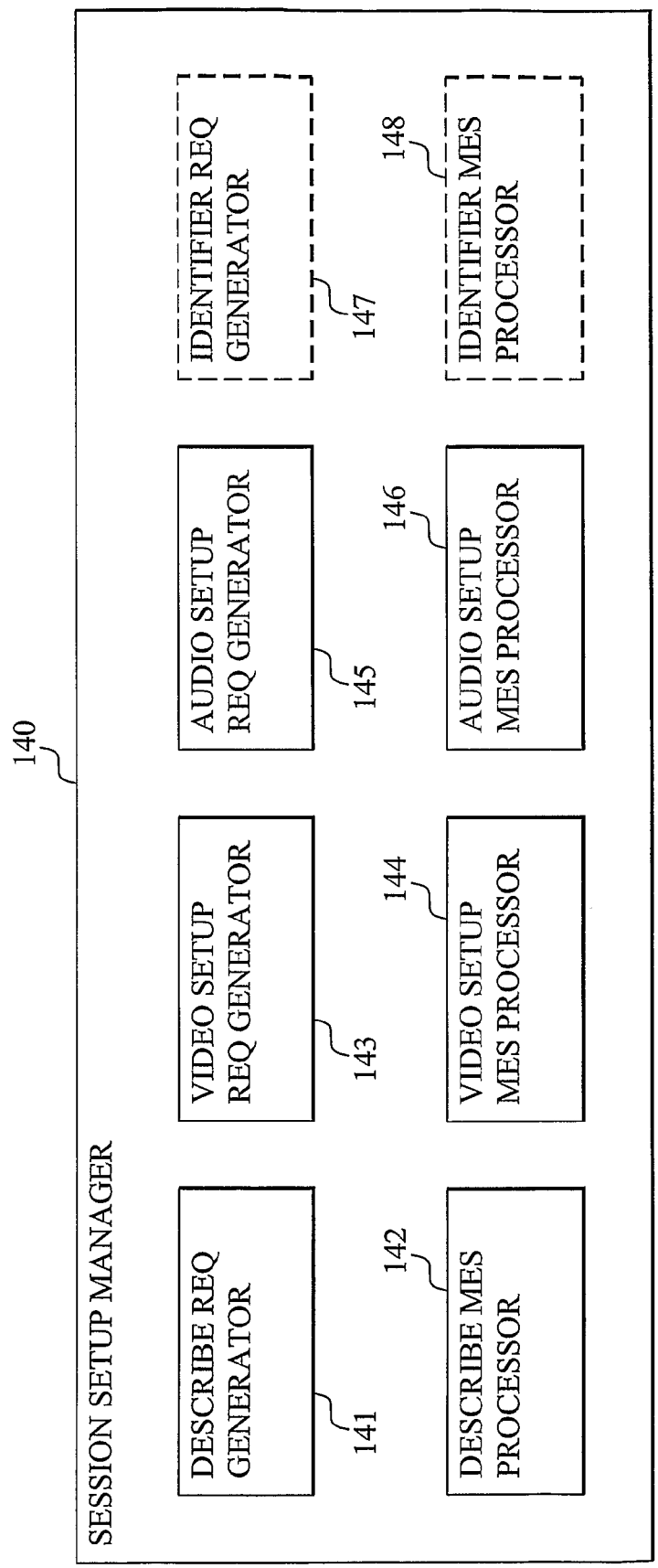
FIG. 10 is a schematic block diagram of a session setup manager according to the present invention implementable in the user terminal of FIG. 9.

FIG. 10 is a schematic block diagram of an embodiment of the session setup manager 140 of the user terminal in FIG. 9. The setup manager 140 optionally, but preferably, comprises a unit 141 for generating a channel-transparent description request. This DESCRIBE request generator 141 compiles the previously discussed channel-transparent DESCRIBE request that could constitute the generic, channel-transparent session request message of the invention.

The resulting DESCRIBE response is processed by an optional but preferred description message processor 142. This processor 142 in particular retrieves the announcement of the multiple media channels available at the media server. In the case, the URIs or other identifiers of the channels are included in the description message, the processor 142 retrieves these identifiers and forwards them to the rendering request generator of the user terminal.

A video setup request generator 143 is provided in the setup manager 140 for composing the channel-transparent video SETUP request of the invention. This SETUP request preferably comprises information of those (video) transport parameters that are acceptable by the user terminal, including the input video ports of the terminal. In an embodiment, this video SETUP request constitutes the generic, channel-transparent session request of the invention.

The setup manager 140 also comprises a video setup message or response processor 144 for processing the video SETUP response from the media server. This means that the processor 144 retrieves information of the video output ports of the media server and those video transport parameters that the media server has selected. This information is forwarded to the transmitter/receiver unit of the terminal for use during the subsequent media data reception.

A corresponding audio setup request generator 145 is preferably implemented in the setup manager 140 for generating a channel-transparent audio SETUP request. This setup request comprises information of those (audio) transport parameters that are acceptable by the user terminal, including the input audio ports of the terminal. In an embodiment, this audio SETUP request constitutes the generic, channel-transparent session request of the invention.

The manager 140 comprises an audio setup response or message processor 146. This processor 146 processes the audio SETUP response received by the terminal receiver and generated in response to the audio SETUP request generator by the generator 145 and transmitted by the terminal transmitter. The processor 146 in particular retrieves information of the audio transport parameter selected by the media server and the output ports for the audio content. Also this information is forwarded to the receiver of the terminal to use during the media reception.

It is anticipated by the present invention, that the video setup generator 143 and processor 144 of the audio setup generator 145 and processor 146 could be omitted from the setup manager 140. In such a case, the media content will only contain audio content or video content. However, for most typical implementations both the video and audio generators/processors 143, 144, 145, 146 are required and implemented in the setup manager 140.

In case the channel identifiers were not included in the description message processed by the describe reply processor 142 or no such describe response has been received, the setup manager 140 preferably utilizes an optional but preferred identifier request generator 147. This generator 147 composes a request message for the identifiers of the available unicast-based channels at the media server. The generated message is typically transmitted to the server but could alternatively be transmitted to some other network node having access to this information.

The response message from the media server or other node is forwarded from the terminal receiver to an identifier response processor 148 of the setup manager 140. This processor 148 retrieves the information of the media channels, typically in the form of URIs and preferably in the form of AC URIs, included in the reply. The identifier information is then forwarded to the rendering request generator and used by the generator when composing the channel-specific rendering request.

If the channel identifiers are notified through broadcast or multicast transmission, the identifier message processor 148 is configured for processing the received broadcast/multicast information and retrieving the channel identifier information therefrom.

The units 141 to 148 of the session setup manager 140 may be provided as software, hardware or a combination thereof. The units 141 to 148 may be implemented together in the setup manager 140. Also a distributed implementation is possible with some of the units provided elsewhere in the user terminal.

Figure 11:
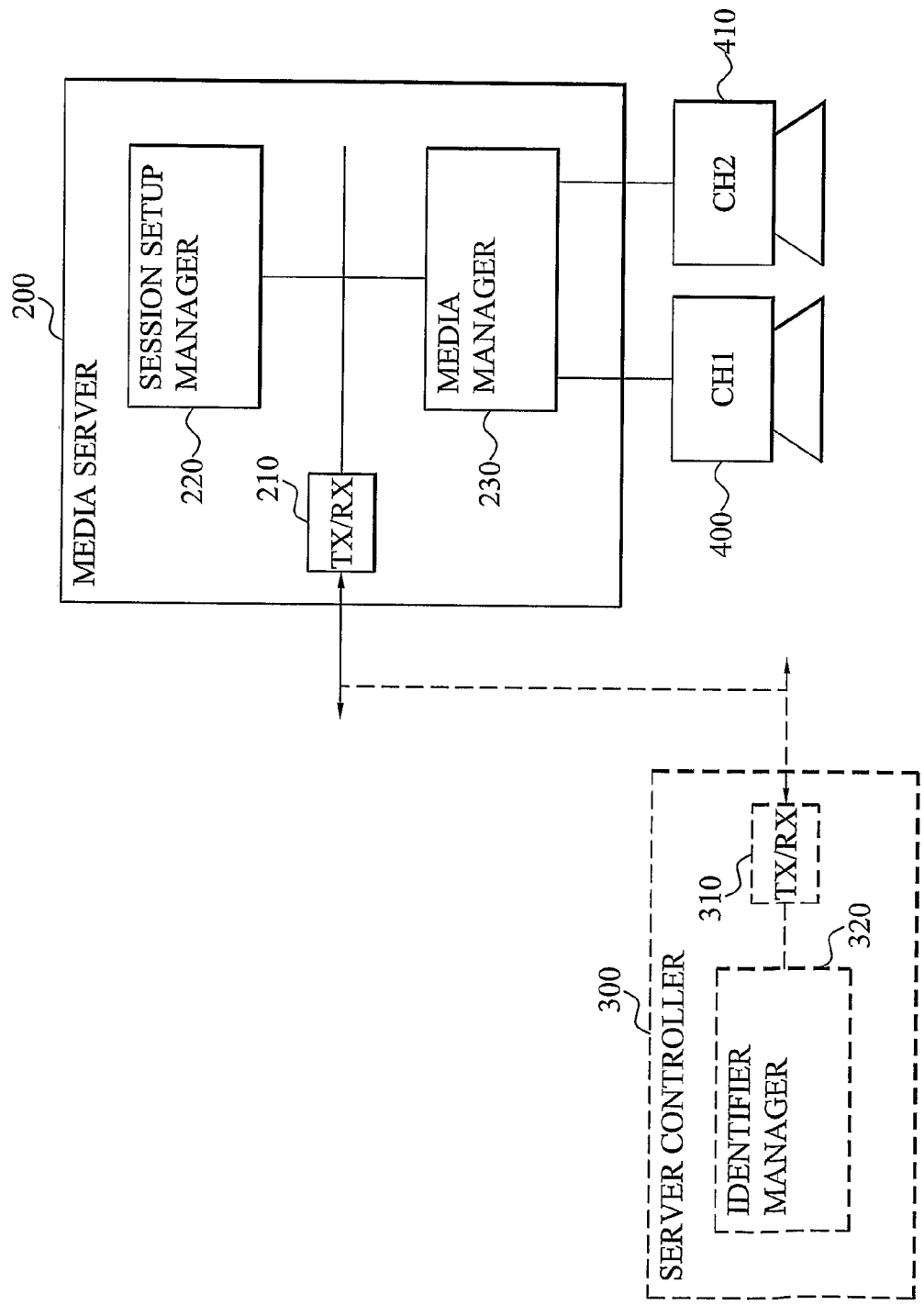
FIG. 11 is a schematic block diagram of a media server according to the present invention.

FIG. 11 is a schematic block diagram of a media server 200 according to the present invention. The media server 200 comprises a transmitter and receiver unit 210 arranged for conducting communication with external units and processing incoming and outgoing messages. The transmitter 210 is in particular implemented for transmitting response messages and data packets comprising media data to a user terminal. The receiver 210 is in particular implemented for receiving request messages from the user terminal.

The media server 200 comprises or has access to multiple media channels 400, 410. This means that the server 200 could comprise or be connected to a data bank storing prerecorded media content. Alternatively, or in addition, the media source could be in the form of live media content received at the media server 200 for further transmission to requesting terminals. A media manager 230 of the server 200 is implemented for taking care of the correct media processing, such as selecting correct media content for the different terminals, generating the data packets with the media content.

The media server 200 further includes a session setup manager 220 that constitutes a means for performing a generic, channel-transparent unicast-based media session setup procedure with a user terminal. This setup manager 220 is triggered upon reception by the receiver of a generic, channel-transparent session request originating form the terminal. The setup manager 220 generates channel-transparent response messages and processes channel-transparent request messages that are transmitted by the transmitter 210 to the user terminal and received by the receiver 210 from the terminal respectively.

Once the channel-transparent session setup procedure has been completed and the receiver 210 receives a channel-specific rendering request, this request is brought to the media manager 230. The media manager 230 identifies the correct media channel based on a channel identifier in the request and forwards the media content of that channel to the transmitter 210. The transmitter uses the transport mechanism negotiated by the session setup manager 220 for forwarding the data content to the terminal.

If the receiver 210 subsequently receives a new channel-specific rendering request from the terminal, the media manager 230 will after processing the request switch the media content delivery from the previous media channel to the newly requested channel.

Reception of a pause request will trigger the media manager 230 to temporarily stop providing media content to the terminal that sent the request. If a new channel-specific rendering request is later received, the manager 230 will provide media data content of that channel to the transmitter 210 for delivery to the user terminal during the ongoing session.

FIG. 5 schematically illustrated the usage of a separate server controller 300 that can be used in the wireless, radio-based communication system for transmitting identifiers of the unicast (and broadcast) channel available from the media server 200. This controller 300 has been indicated in FIG. 11. In such a case, this controller 300 preferably comprises an identifier manager 320 for generating messages comprising this identifier information. A transmitter 310 of the controller 300 then transmits the message, typically in the form of a multicast or broadcast transmission, to the relevant terminals.

The identifier manager 320 could also, by means of the transmitter 310, interrogate the media server 200 for information of the media channels, including their identifiers and availability.

The server controller 300 could be connected to and include channel information from several different media servers 200 arranged in the communication system.

The units 210 to 230 of the media server 200 may be provided as software, hardware or a combination thereof. The units 210 to 230 may be implemented together in the server 200 in a single network node. Also a distributed implementation is possible with some of the units provided in different nodes in the network. The same discussion regarding software/hardware implementation also applies to the units 310 and 320 of the server controller 300.

Figure 12:
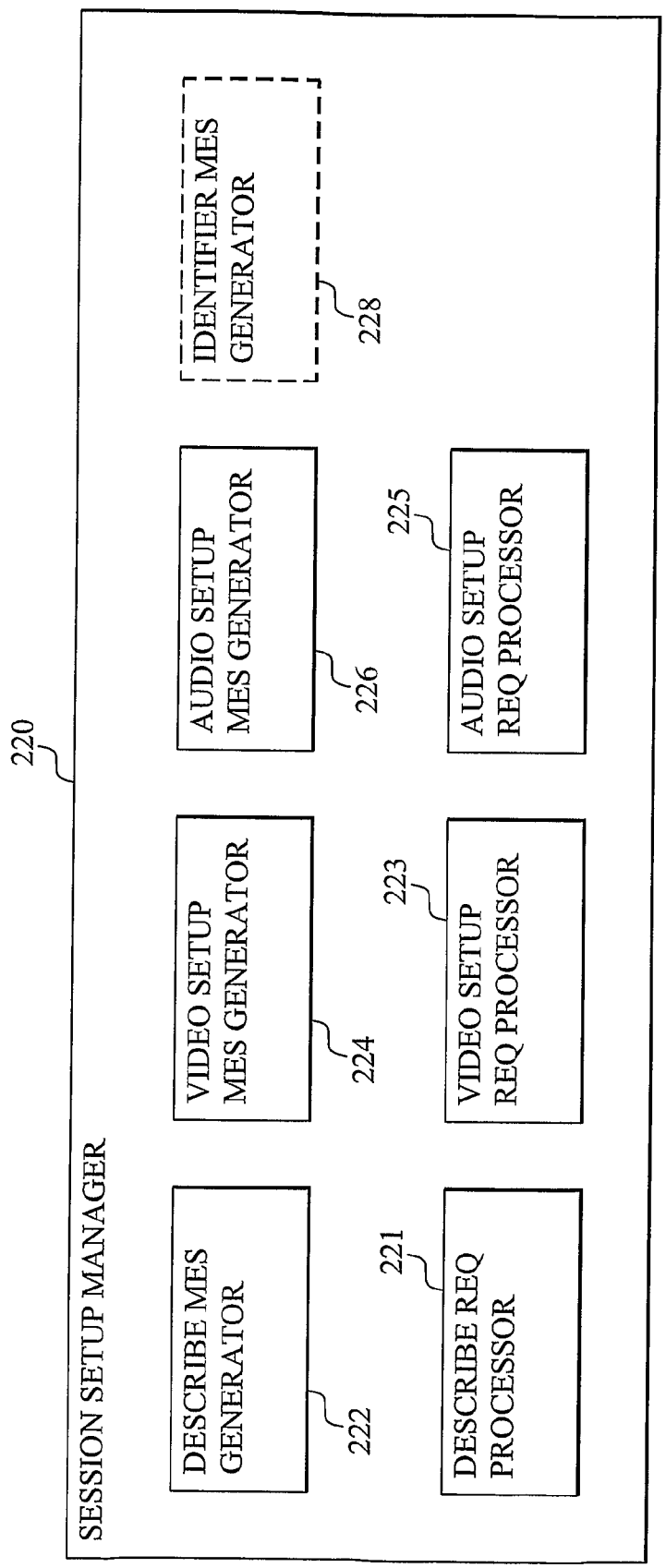
FIG. 12 is a schematic block diagram of a session setup manager according to the present invention implementable in the media server of FIG. 11.

FIG. 12 is a schematic block diagram of a session setup manager 220 of the media server in FIG. 11. The setup manager 220 optionally but preferably comprises a description request processor 221 for processing a channel-transparent request from a user terminal. The processor 221 typically identifies the terminal from which the request originates and notifies an optional but preferred description response or message generator 222. The generator compiles the previously discussed DESCRIBE response that comprises an announcement of the media channels available at the media server. This announcement could be the actual identifiers or URIs of the channels or a notification that multiple channels could be selected by the terminal, in which case their identifiers will be notified separately.

A video setup request processor 223 and audio setup request processor 225 processes received video and audio SETUP requests. The processors 223, 225 selects transport parameters, including output video and audio ports to use for the session. This information is forwarded both to the transmitter of the media server for use in the forthcoming media delivery and to a respective video setup response generator 224 and audio setup response generator 226. The generators 224 compiles the respective video and audio SETUP responses comprising the input transport parameters for transmission to the terminal. The video SETUP response generator 224 preferably also includes a session identifier generated at the media server and included in all subsequent responses and requests exchanged between the server and the user terminal.

In the case the describe response generator 222 did not include the identifiers of the media channels in the describe response, the setup manager 220 could utilize an optional identifier message generator 228. This generator 228 composes a message comprising identifiers, such as AC URIs, of the unicast-based media channels currently available at the server. The generator 228 could be operated upon reception of an explicit request from the user terminal. Alternatively, the generated message could be broadcast or multicast by the server to multiple terminals.

The units 221 to 228 of the session setup manager 220 may be provided as software, hardware or a combination thereof. The units 221 to 228 may be implemented together in the setup manager 220. Also a distributed implementation is possible with some of the units provided elsewhere in the media server.

It will be understood by a person skilled in the art that various modifications and changes may be made to the present invention without departure from the scope thereof, which is defined by the appended claims.

REFERENCES

[1] WO 2006/096104
[2] 3GPP TS 26.234 v7.1.0; $3^{rd}$ Generation Partnership Project; Technical Specification group Services and System Aspects; Transparent end-to-end Packet-switched Streaming Service (PSS); Protocols and codecs, December 2006
[3] Network Working Group, Request for Comments: 2327, April 1998, SDP: Session Description Protocol
[4] Network Working Group, Request for Comments: 2326, April 1998, Real Time Streaming Protocol (RTSP)
[5] Network Working Group, Request for Comments: 4234, October 2005, Augmented BNF for Syntax Specifications: ABNF

The invention claimed is:

1. A method of managing a unicast-based media session involving a user terminal and a media server providing multiple media channels, each media channel carrying a respective media content, said method comprising the steps of:
said user terminal transmitting, to said media server, a generic, channel-transparent session request comprising no channel-specific identifiers;
said user terminal performing, with said media server and based on said session request, a generic, channel-transparent media session setup procedure; and
said user terminal transmitting, to said media server, a channel-specific rendering request in the form of a Real Time Streaming Protocol (RTSP) PLAY request for a first media content of a first media channel of said multiple media channels once said generic, channel-transparent media session setup procedure has been completed, wherein said RTSP PLAY request comprises a unique media content resource identifier associated with said first media content.

2. The method according to claim 1, further comprising:
said user terminal transmitting, to said media server, a channel-specific rendering request for a second media content of a second media channel of said multiple media channels to switch from said first media channel to said second media channel during said media session.

3. The method according to claim 1, further comprising:
said user terminal transmitting, to said media server, a rendering pause request to temporarily pause the reception of media data of said first media channel from said media server; and
said user terminal transmitting, to said media server, a channel-specific rendering request for a second media content of a media channel of said multiple media channels to resume reception of media data during said media session, wherein said channel-specific rendering request comprises a unique media content resource identifier associated with said media content.

4. A method of managing a unicast-based media session involving a user terminal and a media server providing multiple media channels, each media channel carrying a respective media content, said method comprising the steps of:
said media server receiving, from said user terminal, a generic, channel-transparent session request comprising no channel-specific identifiers;
said media server performing, with said user terminal and based on said session request, a generic, channel-transparent media session setup procedure; and
said media server transmitting, to said user terminal and based on a channel-specific rendering request in the form of a Real Time Streaming Protocol (RTSP) PLAY request for a first media content of a first media channel of said multiple media channels originating from said user terminal and received once said generic, channel-transparent media session setup procedure has been completed, media data of said first media channel, wherein said RTSP PLAY request comprises a unique media content resource identifier associated with said first media content.

5. The method according to claim 4, further comprising:
said media server transmitting, to said user terminal and based on a channel-specific rendering request for a second media content of a second media channel of said multiple media channels originating from said user terminal, media data of said second media channel during said media session.

6. The method according to claim 4, further comprising:
said media server temporarily pausing, based on a rendering pause request originating from said user terminal, transmission of said media data of said first media channel to said user terminal; and
said media server transmitting, to said user terminal based on a channel-specific rendering request for media content of a media channel of said multiple media channels originating from said user terminal, media data of said requested media channel, wherein said channel-specific rendering request comprises a unique media content resource identifier associated with said media content.

7. A method of switching media channel in a unicast-based media session involving a user terminal receiving a first media content of a first media channel from a media server providing said first media channel and a second media channel, said method comprising:
said user terminal transmitting, to said media server, a generic, channel-transparent session request comprising no channel-specific identifiers;
said user terminal performing with said media server and based on said session request, a generic channel-transparent media session setup procedure;
said user terminal receiving said first media content of said first media channel from said media server;
said user terminal transmitting, to said media server, a channel-specific rendering request in the form of a Real Time Streaming Protocol (RTSP) PLAY request for a second media content of said second media channel during said ongoing unicast-based media session, wherein said RTSP PLAY request comprises a unique media content resource identifier associated with said second media content.

8. The method according to claim 7, wherein said transmitting step comprises said user terminal transmitting, to said media server, said channel-specific rendering request comprising a session identifier associated with said ongoing unicast-based media session and assigned during set-up of said unicast-based media session.

9. The method according to claim 7, further comprising said user terminal receiving media data of said second media channel on same input ports as was used by said user terminal for receiving media data of said first media channel.

10. A user terminal comprising:
a transmitter for transmitting a generic, channel-transparent session request to a media server providing multiple media channels, each media channel carrying a respective media content, said generic, channel-transparent session request comprises no channel-specific identifiers; and
a processor for performing, with said media server and based on said session request, a generic, channel-transparent unicast-based media session setup procedure,
wherein said transmitter is arranged for transmitting, to said media server, a channel-specific rendering request in the form of a Real Time Streaming Protocol (RTSP) PLAY request for a first media content of a first media channel of said multiple media channels once said processor has completed said generic, channel-transparent media session setup procedure, wherein said RTSP PLAY request comprises a unique media content resource identifier associated with said first media content.

11. The user terminal according to claim 10, wherein said processor is arranged for:
generating a generic, channel-transparent setup request destined to said media server; and
processing a generic, channel-transparent setup message, originating from said media server and generated based on said setup request, said generic, channel-transparent setup message comprises information of at least one communications port to use by a receiver of said user terminal during said media session.

12. The user terminal according to claim 10, wherein said processor is arranged for:
retrieving, from an identifier message, a unique media content resource identifier for each media content of said multiple media channels, said user terminal further comprises:
generating said rendering request based on a unique media content resource identifier associated with said first media content.

13. The user terminal according to claim 10, wherein said transmitter is arranged for transmitting, to said media server, a channel-specific rendering request for a second media content a second media channel of said multiple media channels to switch from said first media channel to said second media channel during said media session.

14. The user terminal according to claim 10, wherein said transmitter is arranged for
i) transmitting, to said media server, a rendering pause request to temporarily pause the reception of media data of said first media channel from said media server, and
ii) transmitting, to said media server, a channel-specific rendering request for media content of a media channel of said multiple media channels to resume reception of media data during said media session.

15. A user terminal comprising:
a transmitter for transmitting a generic, channel-transparent session request to a media server providing multiple media channels, each media channel carrying a respective media content, said generic, channel-transparent session request comprising no channel-specific identifiers;

a processor for performing, with said media server and based on said session request, a generic, channel-transparent unicast-based media session setup procedure;

a receiver for receiving first media content from a first media channel from said media server a channel switch for switching from said first media channel carrying said first media content to a second media channel carrying a second media content during an ongoing unicast-based media session, said channel switch is arranged for generating a channel-specific rendering request in the form of a Real Time Streaming Protocol (RTSP) PLAY request for said second media channel and comprising a unique media content resource identifier associated with said second media content; and a transmitter for transmitting said RTSP PLAY request to said media server providing said first media channel to said user terminal and having access to said second media channel.

16. A media server providing multiple media channels, each media channel carrying a respective media content, said media server comprises:

a receiver for receiving, from a user terminal, a generic, channel-transparent session request comprising no channel-specific identifiers;

a processor configured for performing, with said user terminal and based on said session request, a generic, channel-transparent unicast-based media session setup procedure;

a transmitter for transmitting, to said user terminal and based on a channel-specific rendering request in the form of a Real Time Streaming Protocol (RTSP) PLAY request for a first media content of a first media channel of said multiple media channels originating from said user terminal and received by said receiver once said processor has completed said generic, channel-transparent media session setup procedure, media data of said first media channel, wherein said RTSP PLAY request comprises a unique media content resource identifier associated with said first media content.

17. The media server according to claim 16, wherein said processor is arranged for:

generating, based on said session request, a generic, channel-transparent session description message comprising an announcement of said multiple media channels, wherein said transmitter is arranged for transmitting said generic, channel-transparent session description message to said user terminal.

18. The media server according to claim 16, wherein said processor is arranged for:

generating, based on a generic, channel-transparent setup request message received from said user terminal, a generic, channel-transparent setup message comprising information of at least one communications port to use for said media session, wherein said transmitter is arranged for transmitting said generic, channel-transparent setup message to said user terminal.

19. The media server according to claim 16, wherein said transmitter is arranged for transmitting, to said user terminal and based on a channel-specific rendering request for a second media content of a second media channel of said multiple media channels originating from said user terminal, media data of said second media channel during said media session.

20. The media server according to claim 16, wherein said transmitter is arranged for i) temporarily pausing, based on a rendering pause request originating from said user terminal, transmission of said media data of said first media channel to said user terminal, and ii) transmitting, to said user terminal and based on a channel-specific rendering request for media content of a media channel of said multiple media channels originating from said user terminal, media data of said requested media channel.

* * * * *

UNITED STATES PATENT AND TRADEMARK OFFICE
CERTIFICATE OF CORRECTION

| | |
|---|---|
| PATENT NO. | : 8,230,044 B2 |
| APPLICATION NO. | : 12/305161 |
| DATED | : July 24, 2012 |
| INVENTOR(S) | : Einarsson et al. |

It is certified that error appears in the above-identified patent and that said Letters Patent is hereby corrected as shown below:

On the Title Page, in Item (56), under "OTHER PUBLICATIONS", in Column 2, Line 1, delete "Philippe Centric." and insert -- Philippe Gentric. --, therefor.

In Column 16, Line 51, delete "form the" and insert -- from the --, therefor.

In Column 22, Line 29, in Claim 20, delete "for" and insert -- for: --, therefor.

Signed and Sealed this
Twenty-seventh Day of November, 2012

David J. Kappos
*Director of the United States Patent and Trademark Office*